April 30, 1957 A. L. J. SMITH 2,790,921

RED-EMITTING CATHODOLUMINESCENT DEVICES

Filed April 30, 1954

INVENTOR.
ARTHUR L. J. SMITH
BY J. L. Whittaker

United States Patent Office 2,790,921

Patented Apr. 30, 1957

2,790,921

RED-EMITTING CATHODOLUMINESCENT DEVICES

Arthur L. J. Smith, Lancaster, Pa., assignor to Radio Corporation of America, a corporation of Delaware Application April 30, 1954, Serial No. 426,699

18 Claims. (Cl. 313—92)

This invention relates to red-emitting cathodoluminescent devices and specifically to improved red-emitting luminescent screens and kinescopes that are especially well adapted for systems using high currents and/or high voltages and particularly for use in theatre projection color television cathode ray tubes.

A theatre projection apparatus for color television usually comprises three kinescopes, each of which is adapted to produce an image of a primary color. Primary color images, projected from these kinescopes, are superimposed upon one another to produce the final composite color image. A kinescope includes, an evacuated envelope, cathode ray producing means within and at one end of the envelope, and a luminescent screen adapted to be excited by cathode rays impinging thereon from said cathode ray producing means; and cathode ray deflecting means. The luminescent screen usually comprises a thin layer of a finely divided luminescent material or phosphor. The emission properties of the kinescope, such as color, brightness, etc. are partly determined by the nature of the phosphor in the luminescent screen, under normal excitation conditions.

One of the primary color images of most color television systems is a red image. In order to provide satisfactory color television pictures, it is extremely important to provide one of the kinescopes in a theatre projection apparatus with a red-emitting phosphor having desirable emission characteristics. Some desirable characteristics are:

(1) *Proper emission color.*—The emission color of the screen should be a substantially monochromatic, saturated red, such that a color filter is not required. A color filter is undesirable because it reduces the efficiency of the kinescope by absorption of some of the light output, and because it is an additional bulky and expensive component that must be designed into the apparatus. Some previously used phosphors emit orange or yellow-organe images and require a color filter to eliminate the undesirable wavelengths of light. The emission color of the kinescope is of extreme importance in a color television system because white and intermediate colors are obtained by the addition of the three primary images. A careful balance of the primary colors is necessary to maintain true color fidelity. Also, a selection of the proper primary colors makes possible the production of the widest range of intermediate colors.

(2) *Freedom from color shift.*—The color of luminescence emission of some luminescent materials will shift with changes in cathode ray intensity. For example, many selenide-dominated phosphors shift from red to yellow when higher cathode ray excitation intensities are used. Since the balance of primary color images is of extreme importance in color television, a shift of the color characteristics of one of the primary components upsets this balance.

(3) *Freedom from current saturation.*—It is highly desirable that the intensity of luminescence or brightness be a linear function of the amount of cathode ray energy which excites the phosphor. Most red-emitting phosphors that are presently used will emit light intensities proportional to the cathode ray beam strength over a limited range of beam strengths. However, when the phosphor excitation saturation point is reached, increased cathode ray intensity does not yield a proportionate increase in brightness. In some cases, further increase in current intensity produces a decreased brightness. Freedom from current saturation thus is desirable in order to simplify the conversion of electrical signal into light and in order to maintain maximum fidelity in color reproduction.

(4) *Resistance to burn.*—The brightness of many phosphors is permanently impaired when too much energy is used to excite the phosphor. This is sometimes referred to as radiation damage or "burn." To obtain pictures of maximum brightness with theatre projection tubes, it is necessary to use very high excitation energies into the luminescent screen. Hence, burn resistance, or resistance to radiation damage is extremely important in order to maintain high brightness, while extending the useful life of a tube by several orders of magnitude.

Few red-emitting phosphors provide desirably high brightness in addition to all of the other above-described desirable characteristics. Emission from the borate-, sulphide- and selenide-dominated phosphors usually shifts from red to the shorter wavelengths with increased excitation intensity. The borate- and phosphate-dominated phosphors usually have very poor burn resistance characteristics. The germanate-dominated phosphors usually exhibit an extremely low brightness. All of these phosphor types and also most of the silicate-dominated phosphors usually are orange or yellow-orange emitters making it necessary to use a color filter to obtain the desired color. The phosphor types including most of the silicate- and sulphide-dominated phosphors usually exhibit poor current saturation properties. Even zinc beryllium silicate with manganese activator, which is considered to be one of the best red-emitting phosphors, exhibits current saturation at relatively low excitation intensities.

It is an object of this invention to provide methods for preparing improved red-emitting luminescent materials.

Another object is to provide methods for preparing red-emitting phosphors with improved current saturation properties under cathode ray excitation.

A further object is to provide improved red-emitting luminescent screens.

Another object is to provide red-emitting luminescent screens with improved current saturation properties and improved color shift properties under cathode ray excitation.

A further object is to provide improved luminescent screens for tricolor kinescopes.

Another object is to provide improved cathode ray tubes and similar devices including a luminescent screen comprising an improved red-emitting silicate-dominated phosphor.

Another object is to provide improved red-emitting cathode ray tubes that are particularly adapted for projection television purposes.

In general, the invention includes luminescent screens including materials which exhibit cathodoluminescence emission in the range between 6400 A and 6650 A, said materials having the molar composition $$a\text{MgO}\cdot b\text{CdO}\cdot c\text{ZnO}\cdot d\text{SiO}_2{:}e\text{Mn}$$

wherein $a$=.25 to .80, $b$=.20 to .75, $c$=.00 to .55, $d$=0.9 to 1.1, $e$=0.001 to 0.1, and $a+b+c=1$. The material may be prepared by a method which comprises preparing an intimate mixture of materials containing between .25 and .80 mols MgO, between .20 and .75 mol CdO, between .00 and .55 mols ZnO, 0.9 to 1.1 mols $SiO_2$ and activator proportions of manganese; the molar sum of the portions of MgO, CdO, and ZnO being equal to 1.0; and firing said mixture at a temperature between 1100° C. and 1500° C. in an oxidizing atmosphere. The invention also includes cathode ray tubes including screens or targets of the luminescent material of the invention. The screens or targets may be a layer of uniform composition or may comprise a plurality of areas, such as parallel strips or circular areas.

The foregoing objects and other advantages of the invention will be more apparent and the invention will be more completely described by reference to the accompanying drawing in which.

Similar reference characters are supplied to similar elements throughout the drawing.

*Example 1.*—A preferred luminescent material may be prepared as follows: A mixture is prepared of the following ingredients:

| | Mole part |
|---|---|
| Magnesium carbonate | 0.70 |
| Cadmium carbonate | 0.20 |
| Zinc carbonate | 0.10 |
| Silicon dioxide | 1.00 |
| Manganese carbonate | 0.01 |

These ingredients are preferably of the highest degree of purity obtainable. While carbonates are preferred, other materials which decompose to yield oxides may be used in their place. For example, oxides, carbonates, bicarbonates, hydroxides and nitrates of the component elements may be used. This mixture is ball milled with water for from 4 to 24 hours, and preferably for 12 hours in order to obtain intimate mixture of the ingredients.

The milled mixture is dried, and then fired at about 1200° C. in a steam-containing atmosphere for about 4 hours. However, useable luminescent materials of the invention may be produced by firing in an oxidizing atmosphere in the absence of steam. The firing temperature may be varied between about 1100° and 1500° C. The fired material is cooled, and is then ready for use as a luminescent material. The preferred material of Example 1 exhibits a single-banded cathodoluminescence in the visible region with its peak emission at about 6550 A and relative freedom from shift of the peak emission wavelength with increased excitation intensities. It has the approximate composition $$0.7MgO\cdot 0.2CdO\cdot 0.1ZnO\cdot SiO_2{:}0.01Mn$$

Figures 1, 2:
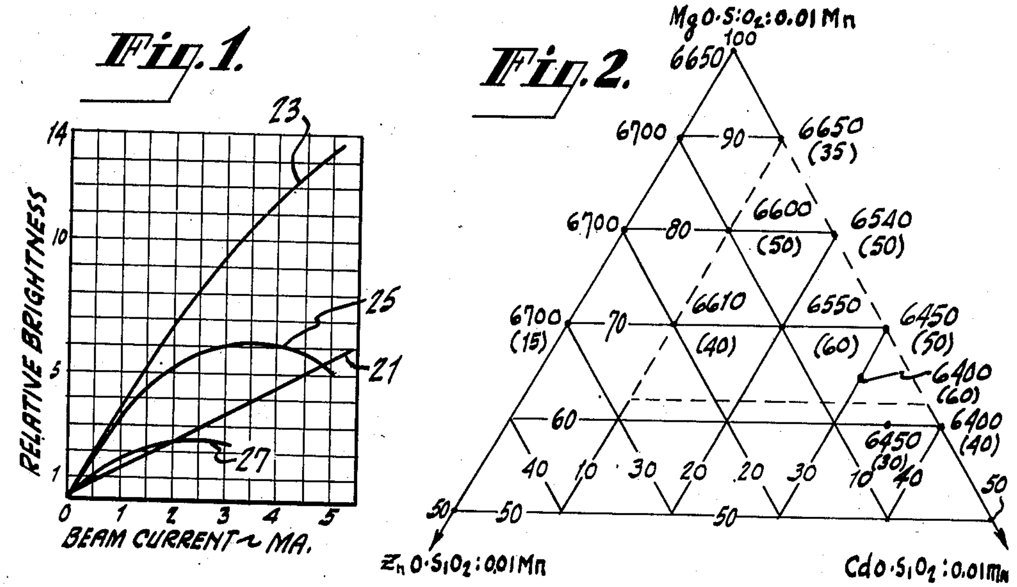
Figure 1 is a graph including a current saturation characteristic curve of a cathode ray tube including a luminescent material of the present invention and, for purposes of comparison, characteristic curves of another red-emitting phosphor.
Figure 2 is a section of a triaxial diagram illustrating the compositions of the invention and includes peak wavelength and relative efficiencies of selected compositions of the invention.

Referring to Figure 1, if the preferred luminescent material described in Example 1 is incorporated in the luminescent screen of a 7" theatre projection kinescope and the tube is operated in its usual manner, curve 21 represents the relative brightness of the screen under standard television raster conditions as the cathode beam current is varied. The relationship between brightness of emission and excitation beam current is approximately linear, and no current saturation is observed up to and above 5 milliamperes. The luminescent screen or curve 21 exhibits essentially the same relative brightness upon initial excitation and upon excitation over long periods of time under standard television raster conditions.

Zinc beryllium silicate with manganese activator, hitherto regarded as one of the phosphors most stable and least subject to non-linearity in current saturation characteristics exhibits relatively poor current saturation characteristics under the same conditions. Curve 23 represents the relative brightness as a function of excitation beam current upon initial excitation of such a 7" tube having a luminescent screen comprising a zinc beryllium silicate with manganese activator. Curve 25 represents the relative brightness of the same zinc beryllium silicate screen after one minute of operation. Initially, this latter luminescence screen has an almost linear light output as a function of beam current. However, continued operation over very short periods of time causes the brightness to decrease and current saturation results. In projection-type kinescopes where the luminescent screen is excited for long periods of time at high levels, the zinc beryllium silicate type phosphor screen may be used only within a very small range of cathode beam currents. The preferred luminescent material of the invention exhibits a linear light output with varying cathode beam current over a range many times the linear range of the zinc beryllium silicate phosphor. At higher excitation current levels, the emission of the luminescent material of the invention is actually brighter than that provided by the zinc beryllium silicate phosphor.

The emission of zinc beryllium silicate phosphor is orange in color. The current saturation characteristics thereof are shown in curves 23 and 25. A color filter is necessary for its use as the red-emitting phosphor in a color television projection system. Curve 27 represents the relative brightness of the emission of the screen of curve 25 after it has passed through a Number 25 Wratten color filter. This color filter transmits approximately the same visual color as the luminescent screen comprising the luminescent material of curve 21. It will be noted that the relative brightness of the zinc beryllium silicate type phosphor is considerably reduced due to the filtering of the shorter wavelengths by the color filter. A kinescope comprising the luminescent material of the invention exhibits the same order of brightness as shown by curve 21, as the filtered light output of the zinc beryllium silicate type kinescope as shown by curve 27 over a short range of low cathode beam currents. However, the phosphor of Example 1 is brighter over a wider current range and at higher beam currents.

*Example 2.*—A second luminescent material may be prepared as follows: An intimate mixture is prepared of the following ingredients:

| | Mole part |
|---|---|
| Magnesium carbonate | 0.70 |
| Cadmium carbonate | 0.15 |
| Zinc carbonate | 0.15 |
| Silicon dioxide | 1.00 |
| Manganese carbonate | 0.01 |

Substitutions of equivalent ingredients may be made as described in Example 1. The mixture is processed and fired as described in Example 1. This material has the composition $0.7MgO\cdot 0.15CdO\cdot 0.15ZnO\cdot SiO{:}0.01Mn$ and exhibits essentially the same characteristics as the luminescent material of Example 1 except that its peak emission in the visible region is at about 6475 A.

*Example 3.*—A third luminescent material may be prepared as follows. An intimate mixture is prepared of the following ingredients:

| | Mole part |
|---|---|
| Magnesium carbonate | 0.80 |
| Cadmium carbonate | 0.20 |
| Silicon dioxide | 1.00 |
| Manganese carbonate | 0.01 |

Substitutions of equivalent ingredients may be made as described in Example 1. The mixture is processed and fired as described in Example 1. This material has the composition $0.8MgO\cdot 0.2CdO\cdot SiO_2{:}0.01Mn$ and exhibits essentially the same characteristics as the luminescent material of Example 1 except that its peak emission in the visible region is at about 6475 A.

While three compositions have been described, other compositions in the same system may be used. Figure 2 shows a portion of the triaxial diagram of $$MgO—ZnO—CdO$$

with 0.01 mole of manganese activator. The compositions of the invention are bounded by the dotted triaxial between the three points $0.9MgO \cdot 0.1CdO \cdot SiO_2:0.01Mn$; $0.625MgO \cdot 0.1CdO \cdot 0.275ZnO \cdot SiO_2:0.01Mn$ and $0.625MgO \cdot 0.375CdO \cdot SiO_2:0.01Mn$. The peak emission wavelength in the visible region and the relative brightness (shown in parenthesis) of selected points on the triaxial diagram are shown. It can be seen that compositions within the dotted triangle exhibit unusually high relative brightness in conjunction with peak wavelength emissions between 6400 A and 6650 A, as compared with other compositions within the entire system. These compositions exhibit the linear brightness characteristics illustrated in Figure 1. In addition, these compositions exhibit a high resistance to burn.

While the manganese activator content is preferably 0.01 mole percent of the host crystal, the content may be varied between about 0.001 and 0.1 moles per mole of host crystal. While the molar ratio of $$CdO+MgO+ZnO$$

to $SiO_2$ is preferably 1.0, the ratio may be varied between 0.9 and 1.1.

Figures 3, 4:
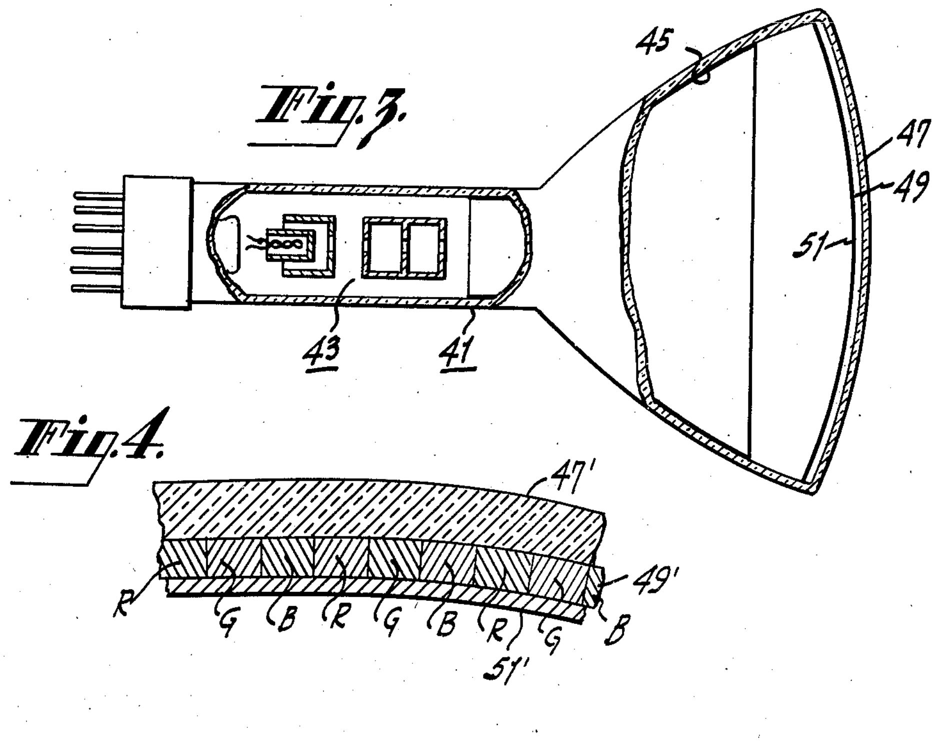
Figure 3 is a partially schematic, partially sectioned elevational view of a projection type cathode ray tube having a luminescent screen comprising a luminescent material of the invention.
Figure 4 is a sectional view of the faceplate of a first tricolor kinescope in accordance with the invention.

Referring to Figure 3, a kinescope according to the invention comprises, for example, an evacuated envelope including a bulb 41 comprising a neck, a conical part and a glass face-plate 47, cathode ray producing means 43 of a conventional type at one end of said envelope, a second anode 45 comprising, for example, a conducting coating on a portion of the neck and conical part of the interior of the evacuated envelope, a thin layer 49 of the luminescent material of the invention coated on the interior surface of the face plate 47, and an aluminum coating 51 superimposed upon the luminescent layer 49.

It is sometimes desirable to produce color television kinescopes having luminescent screens which comprise a plurality of areas having different emissions. One type of tricolor luminescent screen comprises strips of phosphors selectively excited to emit light of different colors. The luminescent material of the instant invention may comprise the red component of such screens and kinescopes.

Referring to Figure 4, a section of a multi-color luminescent screen may comprise the face plate 47′, a luminescent layer 49′, comprising strips of red-emitting phosphor, R, green-emitting phosphor, G, and blue-emitting phosphor, B, and an aluminum coating 51′ superimposed upon the luminescent layer 49′. The red-emitting phosphor of coating 49′ is the red-emitting phosphor of the preferred composition of the invention. The green-emitting phosphor may be, for example, zinc silicate with manganese activator or zinc sulphide with copper activator and the blue-emitting phosphor may be, for example, zinc sulphide with silver activator or calcium magnesium silicate with titanium activator.

Figure 5:
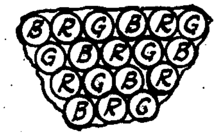
Figure 5 is a partial elevational view of the faceplate of a second tricolor kinescope in accordance with the invention.

Referring to Figure 5, a multicolor luminescent screen may comprise a plurality of tangent circular areas of red-emitting phosphor, R, green-emitting phosphor, G, and blue-emitting phosphor, B. This general type of screen is commonly used in the focus-mask type tricolor kinescope. The red-emitting phosphor is a luminescent material of the invention. The blue and green-emitting phosphors may be any of the phosphors used in the luminescent screens of Figure 4.

Although the discussion of multicolor luminescent screens has been limited to "line" screens of Figure 4 and "dot" screens of Figure 5, the phosphor areas of the screens may be prepared in any geometrical arrangement or order. Similarly multicolor screens may comprise any convenient combination of red-emitting areas utilizing the phosphors described herein and areas of any other color of emission to suit the engineering design.

The compositions described above belong to the general system disclosed in U. S. Patent Nos. 2,306,270, and 2,306,271 to Humboldt W. Leverenz. The preesnt invention includes methods of preparing luminescent materials having substantial cathodoluminescence emission in the range between 6400 A and 6650 A. The present invention also includes luminescent screens and cathode ray tubes having luminescent screens which have substantial cathodoluminescence emission in the range between 6400 A and 6650 A and which exhibit improved cathode current saturation characteristics under standard television raster conditions.

The luminescent screens and cathode ray tubes of the invention are particularly well adapted for use wherever relatively high cathode currents are used to produce a red emission. Examples of such use are in kinescopes for projection television, in direct view kinescopes of the focus type and in similar devices. These devices may be used in theatre projection systems or for domestic use in the home. The luminescent screens of the invention may comprise a uniform composition such that a monochromatic red emission is obtained, or the screen may comprise a plurality of red, green, and blue-emitting areas such that a polychromatic image is obtained. Any geometrical arrangement of red, green and blue areas may be used, for example, as an array of parallel adjacent strips or as an array of tangent circular areas.

There have been described methods of preparing improved red-emitting luminescent materials. Luminescent screens prepared with these materials exhibit good current saturation properties under cathode ray excitation, high resistance to burn, and relative freedom from color shift. There have also been described improved red-emitting luminescent screens and kinescopes which are particularly well adapted for purposes which utilize high cathode ray excitation intensities for relatively long periods of time.

What is claimed is:

1. A luminescent screen having substantial cathodoluminescence emission in the range between 6400 A and 6650 A including a base and a coating on one surface thereof, said coating comprising a material having the molar composition $aMgO \cdot bCdO \cdot cZnO \cdot dSiO_2:eMn$ wherein $a$=0.625 to 0.90
$b$=0.10 to 0.375
$c$=0.00 to 0.275
$d$=0.9 to 1.1
$e$=0.001 to 0.1 and
$a+b+c=1.0$.

2. A luminescent screen having substantial cathodoluminescence emission in the range between 6400 A and 6650 A including a base and a coating on one surface thereof, said coating comprising a material having the molar composition $$.70MgO \cdot .20CdO \cdot .10ZnO \cdot SiO_2:.01Mn$$

3. A luminescent screen having substantial cathodoluminescence emission in the range between 6400 A and 6650 A including a base and a coating on one surface thereof, said coating comprising a material having the molar composition $$.70MgO \cdot .15CdO \cdot .15ZnO \cdot SiO_2:0.01Mn$$

4. A luminescent screen having substantial cathodoluminescence emission in the range between 6400 A and 6650 A including a base and a coating on one surface thereof, said coating comprising a material having the molar composition $$.80MgO \cdot .20CdO \cdot SiO_2:0.01Mn$$

5. A luminescent screen including a base and a coating on one surface thereof, said coating comprising a plurality of areas having substantial emission in the range between 6400 A and 6650 A comprising a material having the molar composition $$a\text{MgO}\cdot b\text{CdO}\cdot c\text{ZnO}\cdot d\text{SiO}_2:e\text{Mn}$$

wherein $a$=0.625 to 0.90
$b$=0.10 to 0.375
$c$=0.00 to 0.275
$d$=0.9 to 1.1
$e$=0.001 to 0.1
and
$a+b+c=1$.

6. A luminescent screen including a base and a coating on one surface thereof, said coating comprising a plurality of areas having substantial emission in the range between 6400 A and 6650 A comprising a material having a molar composition $$.70\text{MgO}\cdot .20\text{CdO}\cdot .10\text{ZnO}\cdot \text{SiO}_2:.01\text{Mn}$$

7. A cathodoluminescent screen including a base and a coating on one surface thereof, said coating comprising a plurality of blue-emitting areas, a plurality of green-emitting areas and a plurality of red-emitting areas, said red-emitting areas comprising a material having substantial emission in the range between 6400 A and 6650 A and having the molar composition $$a\text{MgO}\cdot b\text{CdO}\cdot c\text{ZnO}\cdot d\text{SiO}_2:e\text{Mn}$$

wherein $a$=0.625 to 0.90
$b$=0.10 to 0.375
$c$=0.00 to 0.275
$d$=0.9 to 1.1
$e$=0.001 to 0.1
and
$a+b+c=1$.

8. A cathodoluminescent screen according to claim 7 wherein said areas comprise an array of parallel strips adjacent one another.

9. A cathodoluminescent screen according to claim 7 wherein said areas comprise an array of circular areas that are tangent to one another.

10. A cathodoluminescent screen according to claim 7 wherein said red-emitting areas comprise a material having the molar composition $$.70\text{MgO}\cdot .20\text{CdO}\cdot .10\text{ZnO}\cdot \text{SiO}_2:.01\text{Mn}$$

11. A cathode ray tube comprising an evacuated envelope, cathode ray producing means within said envelope and a luminescent screen adapted to be excited by cathode rays from said cathode ray producing means, said screen having substantial cathodoluminescence emission in the range between 6400 A and 6650 A comprising a material having the molar composition $$a\text{MgO}\cdot b\text{CdO}\cdot c\text{ZnO}\cdot d\text{SiO}_2:e\text{Mn}$$

wherein $a$=0.625 to 0.90
$b$=0.10 to 0.375
$c$=0.00 to 0.275
$d$=0.9 to 1.1
$e$=0.001 to 0.1
and
$a+b+c=1$.

12. A cathode ray tube comprising an evacuated envelope, cathode ray producing means within said envelope and a luminescent screen adapted to be excited by cathode rays from said cathode ray producing means, said screen consisting essentially of a material having the molar composition $$.70\text{MgO}\cdot .20\text{CdO}\cdot .10\text{ZnO}\cdot \text{SiO}_2:.01\text{Mn}$$

13. A cathode ray tube comprising an evacuated envelope, cathode ray producing means within said envelope and a luminescent screen adapted to be excited by cathode rays from said cathode ray producing means, said screen comprising a plurality of areas having substantial cathodoluminescence emission in the range between 6400 A and 6650 A comprising a material having the molar composition $$a\text{MgO}\cdot b\text{CdO}\cdot c\text{ZnO}\cdot d\text{SiO}_2:e\text{Mn}$$

wherein $a$=0.625 to 0.90
$b$=0.10 to 0.375
$c$=0.00 to 0.275
$d$=0.9 to 1.1
$e$=0.001 to 0.1
and
$a+b+c=1$.

14. A cathode ray tube comprising an evacuated envelope, cathode ray producing means within said envelope and a luminescent screen comprising a plurality of areas having substantial emission in the range between 6400 A and 6650 A comprising a material having a molar composition $$.70\text{MgO}\cdot .20\text{CdO}\cdot .10\text{ZnO}\cdot \text{SiO}_2:.01\text{Mn}$$

15. A cathode ray tube comprising an evacuated envelope, cathode ray producing means within said envelope and a luminescent screen comprising a plurality of blue-emitting areas, a plurality of green-emitting areas and a plurality of red-emitting areas, said red-emitting areas comprising a material having substantial emission in the range between 6400 A and 6650 A and having the molar composition $$a\text{MgO}\cdot b\text{CdO}\cdot c\text{ZnO}\cdot d\text{SiO}_2:e\text{Mn}$$

wherein $a$=0.625 to 0.90
$b$=0.10 to 0.375
$c$=0.00 to 0.275
$d$=0.9 to 1.1
$e$=0.001 to 0.1
and
$a+b+c=1$.

16. A cathode ray tube according to claim 15 wherein said areas comprise an array of parallel strips adjacent one another.

17. A cathode ray tube according to claim 15 wherein said areas comprise an array of circular areas that are tangent to one another.

18. A cathode ray tube comprising an evacuated envelope, cathode ray producing means within said envelope and a luminescent screen adapted to be excited by cathode rays from said cathode ray producing means, said screen comprising a plurality of areas having substantial cathodoluminescence emission in the range between 6400 A and 6650 A and consisting essentially of a material having the molar composition $$.70\text{MgO}\cdot .20\text{CdO}\cdot .10\text{ZnO}\cdot \text{SiO}_2:.01\text{Mn}$$

References Cited in the file of this patent

UNITED STATES PATENTS

| | | |
|---|---|---|
| 1,934,821 | Rudenberg | Nov. 14, 1933 |
| 2,306,270 | Leverenz | Dec. 22, 1942 |
| 2,306,271 | Leverenz | Dec. 22, 1942 |
| 2,457,054 | Leverenz | Dec. 21, 1948 |
| 2,508,267 | Kasperowicz | May 16, 1950 |
| 2,511,572 | Ellefson | June 13, 1950 |
| 2,525,028 | Froelich | Oct. 10, 1950 |

FOREIGN PATENTS

| | | |
|---|---|---|
| 466,503 | Great Britain | May 28, 1937 |